United States Patent

Onodera et al.

[11] Patent Number: 5,843,562
[45] Date of Patent: Dec. 1, 1998

[54] LCP FILMS HAVING ROUGHENED SURFACE AND PROCESS THEREFOR

[75] Inventors: Minoru Onodera; Takeichi Tsudaka; Toshiaki Sato, all of Kurashiki, Japan; Randy Douglas Jester, Greer; Leonard R. Garrett, deceased, late of Greer, both of S.C., by Karen D. Garrett, legal representative; Detlef Frank, Mainz, Germany

[73] Assignees: Hoechst Celanese Corporation, Warren, N.J.; Kuraray Co. Ltd., Osaka, Japan

[21] Appl. No.: 857,404

[22] Filed: May 16, 1997

Related U.S. Application Data

[63] Continuation of Ser. No. 436,996, May 8, 1995, abandoned, which is a continuation-in-part of Ser. No. 995,240, Dec. 22, 1992, abandoned.

[51] Int. Cl.6 .................................................. C09K 19/02
[52] U.S. Cl. .............................. 428/141; 428/1; 428/480; 428/220; 428/338; 428/910
[58] Field of Search ................................ 428/1, 141, 480, 428/220, 338, 910

[56] References Cited

U.S. PATENT DOCUMENTS

| | | | |
|---|---|---|---|
| 4,053,208 | 10/1977 | Kato et al. | 350/117 |
| 4,803,235 | 2/1989 | Okada | 524/494 |
| 4,942,095 | 7/1990 | Buchert et al. | 428/461 |
| 4,963,402 | 10/1990 | Wong | 428/1 |
| 4,997,724 | 3/1991 | Suzuki et al. | 428/627 |
| 5,210,107 | 5/1993 | Jester et al. | 521/182 |
| 5,217,762 | 6/1993 | Frank | 428/1 |

FOREIGN PATENT DOCUMENTS

| | | |
|---|---|---|
| 0008382A1 | 3/1980 | European Pat. Off. . |
| 0089746A3 | 9/1983 | European Pat. Off. . |
| 0304153A2 | 2/1989 | European Pat. Off. . |
| 0464643A1 | 1/1992 | European Pat. Off. . |
| 4166323 | 6/1992 | Japan . |

OTHER PUBLICATIONS

Translation of JP–A 4–166323 Laid Open Patent Application, Jun. 12, 1992.
Abstract of JP–A 2–052738 Dated Feb. 22, 1990.
A Database WPI, Section Ch, Week 9230, Derwent Publications Ltd. London, GB: AN 92–246449 & JA–A-4 166 323.
(Nitika Ltd.), Jun. 12, 1992 & Patent Abstracts of Japan, vol. 16, No. 467 (M–1317) Sep. 29, 1992 & JP–A–04 166 323.

*Primary Examiner*—William P. Watkins, III

[57] ABSTRACT

A film having a roughened surface. The film is made of an LCP and has surface recessions covering at least about 25% of the area of the surface. The film is made by pressing an embossing means against the film surface at a temperature about 15°–75° C. below the melting point of the polymer. The embossed film has improved resistance to abrasion.

5 Claims, 2 Drawing Sheets

LCP FILMS HAVING ROUGHENED SURFACE AND PROCESS THEREFOR

This application is a continuation of U.S. Ser. No. 08/436,996 filed May 8, 1995, now abandoned, which was a continuation-in-part of U.S. Ser. No. 07/995,240 filed Dec. 22, 1992 also now abandoned.

BACKGROUND OF THE INVENTION

The present invention relates to a film comprising a polymer capable of forming an optically anisotropic melt phase (hereinafter sometimes referred to as "liquid crystal polymer" or "LCP"), particularly such a film having a roughened or embossed surface.

LCP films are known to have excellent thermal resistance, and therefore are attractive as substrates in high temperature applications, such as a substrate that must resist high temperatures produced by soldering. (See Japanese Laid-Open Application No. 2-52738 (1990)). However, melt extruded LCP films typically have poor surface abrasion resistance and tend to generate fluffs upon abrasion, perhaps due to molecular orientation. This drawback has significantly limited end-use development for LCP films.

Japanese Patent Application Laid-Open No. 4-166323 (1992) discloses an LCP film having a mean roughness of 10 points method, SRz, of from ¹⁄₂₀ to ½ of the thickness thereof. The application does not describe how much area is occupied by recessions on the film surface.

SUMMARY OF THE INVENTION

The present invention comprises a film comprising a polymer capable of forming an optically anisotropic melt phase, said film having at least one surface having a multiplicity of recessions, said recessions occupying at least about 25% of the area of said surface.

The present invention further comprises a process for forming said film comprising embossing a surface of a film comprising said polymer at a temperature from about 75° C. below to about 15° C. below the melting point of said polymer, said embossing being done by applying to said surface an embossing means having projections suitable to produce the desired film surface recessions.

According, an object of the present invention is to provide a film comprising a liquid crystal polymer and having improved abrasion resistance.

Another object of the present invention is to provide a film having a reduced coefficient of friction ("COF").

Another object of the present invention is to provide a process for producing the above film.

Other objects of the present invention will be apparent to those skilled in the art from the following description and appended claims.

DETAILED DESCRIPTION OF THE PREFERRED EMBODIMENTS

The film of the present invention comprises at least one surface having a multiplicity of recessions. The term "recessions" herein means concaves formed on a substantially continuous surface plane (hereinafter referred to as "base surface"), which concaves may comprise a multiplicity of still more minute projections and recessions (see FIG. 1). In this case, the minuter recessions are distinguished from the recession defined in the present invention. Where the perimeter of a recession projects from the base surface, the ridge of the projection forms the perimeter of the recession (see FIG. 2).

Figure 3:
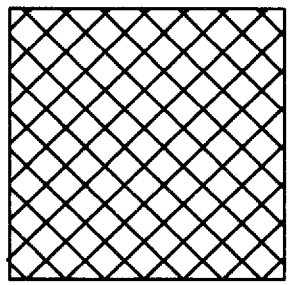
FIG. 3 illustrates a plan view of a pattern of intersecting recessions on the surface of a film of the present invention.
Figure 4:
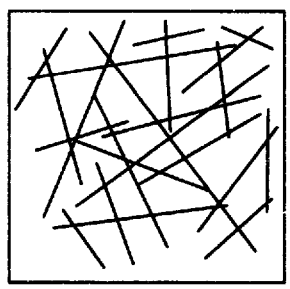
FIG. 4 illustrates a plan view of an irregular pattern of recessions on the surface of a film of the present invention.
Figure 5:
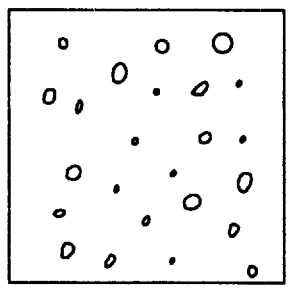
FIG. 5 illustrates a plan view of a pattern of non-intersecting recessions on the surface of a film of the present invention.

In the present invention, the recessions on the film surface may form any pattern. Representative examples of the pattern include a multiplicity of parallel diagonal straight endless grooves having a constant pitch and crossing each other at a constant angle (see FIG. 3), a multiplicity of straight grooves having various lengths with random pitches and some of them crossing each other at random angles (see FIG. 4), a multiplicity of randomly arranged discrete pseudo-true circular concaves that give satin finished surface (see FIG. 5), and the like. The recessions in the present invention may form a wide variety of different patterns comprising straight and/or curved lines, discrete pseudo-true circles, random matte textures, embossed patterns such as are found on fabric, or the like, or combinations thereof.

Hereinafter, a recession having a length/breadth ratio of at least 10 shall be considered a groove and one having the ratio of at least 1 and not more than 10 shall be considered a pseudo-true circular concave. The length/breadth ratio herein means the ratio of the longer side length to the shorter side length of a rectangle having a maximum area and with its four vertexes positioned on the perimeter of the recession. In the present invention, the average width is important for the recessions comprising linear grooves and the average diameter of a true circle as converted from the shape is important for those comprising discrete pseudo-true circular concaves. The diameter of a true circle as converted from the shape of a recession herein means the diameter of a true circle having the same area as that of the area surrounded by the perimeter of the recession.

The average width or diameter of the recessions of the film of the present invention is in the approximate range of 1–250 μm, preferably within an approximate range of from 1 to 10 μm. When the average width or diameter is less than about 1 μm, or greater than about 250 μm, the abrasion resistance may be reduced significantly. In thin films having a thickness no greater than about 200 μm the abrasion resistance may be reduced significantly when the width or diameter of a recession exceeds about 10 μm. The width or diameter of a recession can be measured by microscopic observation.

Figure 1:
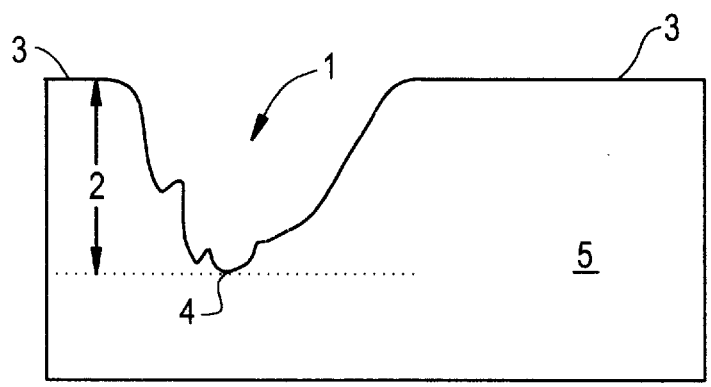
FIG. 1 illustrates a cross-sectional view of a film having a recession according to the present invention.
Figure 2:
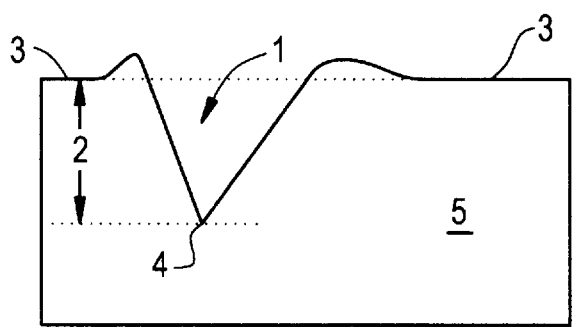
FIG. 2 illustrates a cross-sectional view of a film having a recession according to the present invention.

As is illustrated in FIGS. 1 and 2, the depth of a recession 1 herein means the distance 2 between the base surface 3 and the lowest bottom 4 of the recession 1. The average depth of the recessions 1 of the film 5 of the present invention is preferably within the approximate range of from 1 to 10 μm for thin films. If the average depth is less than about 1 μm, the abrasion resistance will hardly be improved. On the other hand, if the average depth exceeds about 10 μm for a film that is no more than about 200 μm thick, the recessions may impair the thickness precision of the film and, further, the mechanical properties of the film may be adversely affected, such that the film may tend to split when subjected to external stress. However, in some cases LCP film of sufficient thickness may be able to accommodate recessions greater than 10 µm in depth without losing the advantages of this invention. Generally, the depth should be less than about 50 µm. The average depth corresponds to maximum height "Rmax" in accordance with the definition of surface roughness in JIS BO601 and can be measured, for example, with an instrument for the measurement of surface roughness by the stylus method.

In thin films having a thickness no greater than about 200 µm, it is desirable that a ratio of the average width or diameter to the average depth of the recessions is about 5.5 or less, more preferably about 2.0 or less and most preferably about 1.5 or less. If the ratio exceeds 5.5 for thin films, the abrasion resistance will hardly be improved.

In the film of the present invention, the recessions occupy approximately from 25 to 100%, preferably about 25–80%, of the area of the surface comprising them. This percentage is defined as $[(S_1-S_2)/S_1] \times 100$ (%) wherein $S_1$ means the original surface area before provision of the recessions and $S_2$ the remaining surface area excluding that occupied by the recessions. If the area percentage of the recessions is less than 25%, the abrasion resistance will hardly be improved. In thin films (no more than about 200 µm thick), if this percentage exceeds about 80%, the film properties, such as tear strength, will tend to deteriorate. The area percentage can be determined by microscopic observation.

Films according to the present invention may vary widely in thickness. It is understood that the maximum size and total area of the film recessions will be limited by the thickness of the film. Beyond these limits, film properties such as abrasion resistance, mechanical strength, and the like will deteriorate. The description and Examples contained herein will enable one skilled in the art to determine appropriate recession parameters for a given film.

In the present invention, where the recessions form a pattern in which adjacent recessions do not cross each other, such as discrete pseudo-true circles or parallel-arranged lines, it is desirable that the average pitch of adjacent recessions be in the approximate range of 1 to 30 µm. The average pitch herein means an average of the distances between the centers of adjacent recessions. The center of a recession having the shape of a discrete pseudo-true circle herein means the intersecting point of the two diagonal lines of a rectangle having a maximum area and with its four vertexes positioned on the perimeter of the recession. The center of a groove-like recession herein means the central line along it length. The average pitch of the recessions can be determined by microscopic observation.

The film of the present invention may have any thickness with no specific limitation, but the thickness is preferably not more than about 500 µm for FPC (flexible printed circuit) use, more preferably from about 20 to about 250 µm.

The film of the present invention can be obtained by, for example, forming a liquid crystal polymer into a film by a known film formation process which may include stretching operation, such as T-die process or tubular film process, and embossing the obtained film at a temperature in a range of from about 75° C. lower than the melting point of the liquid crystal polymer to about 15° C. lower than the same melting point with an embossing means having a specific projection pattern. The specific projection pattern of the embossing means used corresponds to the specific pattern of the recessions to be possessed by the film of the present invention. In one preferred embodiment, it is necessary that the embossing means have on the surface thereof projections having an average width or an average diameter of a true circle converted from the shape thereof of approximately 1 to 10 µm and an average height of approximately 1 to 10 µm and occupying an area of approximately 25 to 80% of the total surface, for optimum low fibrillation on thin films about 200 µm thick or less.

In the embossing means for thin films, it is preferable that a ratio of the average width or diameter to the average height of the projections is about 5.5 or less, more preferably about 2.0 or less, and most preferably about 1.5 or less.

It is desirable to use as the embossing means at least one pair of press rolls at least one of which has the specific projections on its surface (hereinafter referred to as "roll with roughened surface") or at least one pair of press belts at least one of which has the projections on its surface (hereinafter referred to as "belt with roughened surfaced"). Selection of these embossing means make possible continuous embossing treatment. However, other equivalent embossing means having the necessary projections may be used, e.g., a press with plates. Those skilled in the art will be able to select the optimum means for a given application.

Where press rolls or press belts are used, it is desirable to pass a film comprising a liquid crystal polymer between a pair of the press rolls or press belts having a temperature in an approximate range of from 75° C. lower than the melting point of the liquid crystal polymer to 15° C. lower than the same melting point. Using this relatively simple process, the film is pressed and, at the same time, heated to substantially the same temperature as the press rolls or belts. However, it may be sufficient that only one of the press rolls or belts holding the film is at the above temperature.

If a flat film extrusion process is used, it is possible to emboss the film by extruding it into a cooling and polishing unit having one or two rolls which have the necessary surface texture.

Under the temperature condition employed upon embossing according to the present invention, the embossed film does not substantially melt. If the temperature upon embossing is higher than about 15° C. lower than the melting point of the liquid crystal polymer, the film will partly adhere to the surface of the press rolls or belts, thereby being deformed and decreasing the film's mechanical properties markedly. On the other hand, an embossing temperature lower than about 75° C. lower than the melting point of the liquid crystal polymer will not cause the embossing pattern to be sufficiently transferred to the film.

The melting point of a liquid crystal polymer herein means the temperature at which an endothermic peak of melting is observed on a specimen film comprising the polymer heated at a temperature elevating rate of 10° C./min by differential scanning calorimetry (DSC).

In the process of the present invention, the pressure applied to the film to be embossed with press rolls is preferably from about 10 to about 200 kg/cm as expressed in terms of linear pressure. If the linear pressure is less than about 10 kg/cm, the effect of improving abrasion resistance will sometimes not be sufficiently produced. If the linear pressure exceeds about 200 kg/cm, the film substantially changes its size and tends to break. In view of minimization of adverse effect on film and production of the effect of sufficiently improving abrasion resistance, the linear pressure is more preferably in an approximate range of from 20 to 100 kg/cm.

Where press belts are used to emboss, the pressure applied to the film to be embossed is preferably about 20 to about 100 kg/cm². If the pressure is less than about 20 kg/cm², the pattern may not be well-embossed and thus the abrasion resistance may not be as pronounced. On the other hand, using a pressure exceeding about 100 kg/cm² does not further improve the abrasion resistance.

It is understood that force is expressed herein in terms of Kg, assuming standard earth gravity. Thus pressure for plate or belt pressing is expressed as Kg/cm². The linear pressure of press rolls herein means the quotient obtained by dividing the force (expressed in Kg) applied to the press roll by the length of the roll in contact with the film (typically, the film width), and is herein expressed as Kg/cm.

Examples of the press rolls usable in the present invention are nickel- or chrome-plated metal rolls and metal rolls coated with a thin layer of a resin such as teflon, silicone or polyimide. Examples of the press belts are those comprising heat-resistant steel such as stainless steel. Examples of the roll with roughened surface and the belt with roughened surface are the above metal rolls and heat-resistant steel belts with their surface having been roughened by chemical or physical methods. Although rolls and belts are preferred in a continuous process, individual plates having a roughened surface could be used to emboss film in a press. Any equivalent embossing means, capable of producing the desired recessions, may be used within the scope of the present invention.

In the process of the present invention, when a liquid crystal polymer film is passed between press rolls or press belts at a temperature in a range of from 75° C. lower than the melting point of the liquid crystal polymer to 15° C. lower than the same melting point, the rotation speed of the press rolls or press belts is preferably not more than about 30 m/min as converted to a linear speed of their circumferences, more preferable not more than about 20 m/min, for the purpose of effectively producing the effect of the invention. There is no specific limitation to the lower limit of the rotation speed, but the speed is preferably maintained at not less than about 0.5 m/min, since too low a rotation speed decreases the productivity The liquid crystal polymers used in the present invention are polymers capable of forming an optically anisotropic melt phase and what are known as thermotropic liquid crystal polymers. The phrase "a polymer capable of forming an optically anisotropic melt phase" herein means that the polymer have the property, when observed with a polarizing microscope with a heating stage and under a crossed nicol, of transmitting polarized light.

Examples of the liquid crystal polymers used in the present invention are known thermotropic liquid crystal polyesters, polyesteramides and the like obtained from starting compounds as exemplified in the following types (1) through (4) and their derivatives.

(1) Aromatic or aliphatic dihydroxy compounds

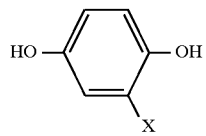

wherein X represents a hydrogen atom, a halogen atom, or a group such as a lower alkyl group or a phenyl group;

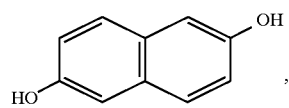

-continued

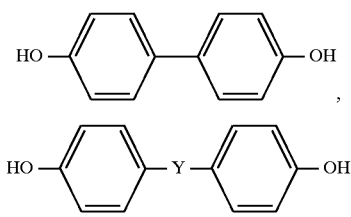

wherein Y is a group such as —O—, —CH₂— or —S—;

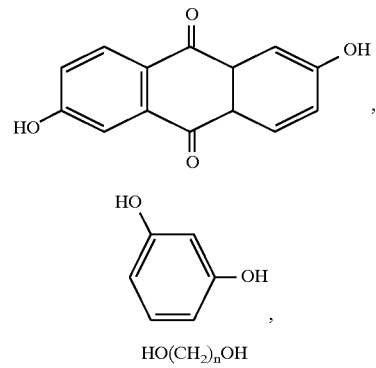

HO(CH₂)ₙOH wherein n represents an integer of 2 to 12.

(2) Aromatic or aliphatic dicarboxylic acids

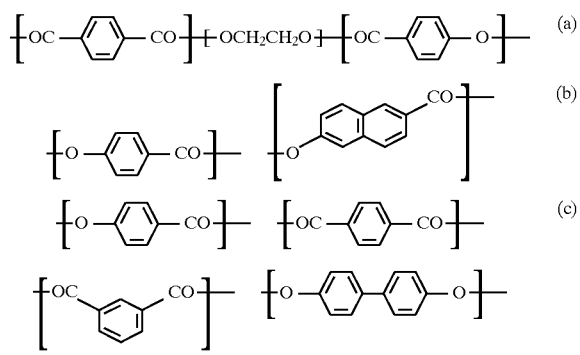

wherein n represents an integer of 2 to 12.

(3) Aromatic hydroxycarboxylic acids,

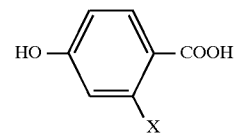

wherein X represents a hydrogen atom, a halogen atom or a group such as a lower aklyl group or a phenyl group,

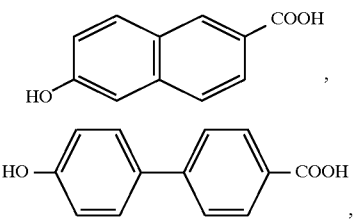

-continued

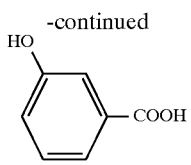

(4) Aromatic diamines, aromatic hydroxy amines and aromatic aminocarboxylic acids

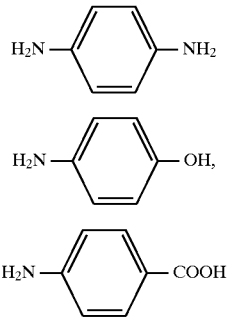

Representative examples of the liquid crystal polymers obtained from these starting material compounds are the following copolymers having structural units in combination as shown in (a) through (e) below.

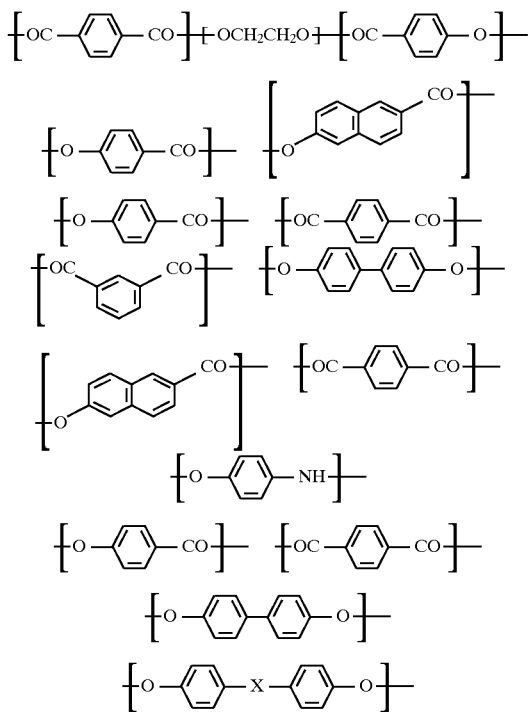

wherein X represents a moiety such as —O—, —CH$_2$—, or —S—.

Because they exhibit a great improvement in abrasion resistance, the liquid crystal polymers used in the present invention are preferably wholly aromatic thermotropic liquid crystal polyesters (III) comprising units from p-hydroxybenzoic acid (I) and units from 6-hydroxy-2-naphthoic acid (II). Further in view of good melt extrusion moldability, it is preferred that the structural unit (II) be contained in the polyester (III) in an approximate amount of 10 to 90 mol %, more preferably approximately 15 to 35 mol % and most preferably approximately 20 to 30 mol %. The structural unit (I) preferably comprises approximately 90 to 10 mol %, more preferably from about 85 to about 65 mol % and most preferably from about 80 to about 70 mol % of the polymer (III).

It is also desirable that the liquid crystal polymers used in the present invention have a transition temperature to an optically anisotropic melt phase in the approximate range of 200° to 400° C., in particular about 250° to about 350° C., to provide desirable thermal resistance and processability. These polymers may contain additives such as lubricant, antioxidant and/or filler, provided that these additives are not present in an amount and are not of a nature that will impair the properties of the resulting films.

One highly preferred LCP for making film according to the present invention is VECTRA® A resin comprising 73 mol % of units derived from p-hydroxybenzoic acid and 27 mol % of units derived from 6-hydroxy-2-naphthoic acid. (VECTRA® A polyester resin is available from Hoechst Celanese Corporation having headquarters in Bridgewater, N.J., U.S.A.).

Many useful applications for film according to the present invention will be apparent to those skilled in the art. One major application is in vacuum lamination processes, the roughened surface may greatly facilitate air removal and thereby improve the quality of the laminate, and the extended area of the roughened surface may promote increased adhesion in laminations. Another important application is as a cover layer film for a flexible printed circuit; the film can provide resistance to fibrillation on the exposed side of a single side circuit. Furthermore, the film of this invention is useful in applications requiring a low COF.

The following Examples are presented to illustrate the present invention. However, the present invention is not limited to the embodiments illustrated or described herein, and includes the entire subject matter of the appended claims.

In the Examples and Comparative Examples that follow, properties were measured according to the following methods:

(1) Melting point of liquid crystal polymer

A specimen liquid crystal polymer film is heated by differential scanning calorimetry at a rate of temperature increase of 10° C./min and the endothermic peak temperature observed is taken as the melting point.

(2) Tensile strength

Measured according to JIS K6854.

(3) Abrasion resistance

On the surface of a horizontally placed specimen a square abrasion mass with its bottom surface having a size of 10 mm×10 mm and covered with a textile fabric. The mass is, while being loaded with a weight of 500 g, moved forward and backward on the film surface by a distance of 30 mm. The number of strokes made until fluffs become visually observed on the film surface is counted and taken as an index of abrasion resistance.

(4) Observation of surface

The size and density of recessions on the surface of a specimen film with roughened surface is measured with a surface roughness tester (Talysurf-6, made by Rank Taylor Hobson), as defined as maximum height, Rmax ($\mu$m), in accordance with JIS B0601-82. Ra($\mu$m) is defined as the arithmetic average roughness.

(5) Coefficient of Friction

The COF was measured using an Instron tensile tester. Two pieces of the tested film were stacked together so that like sides were in contact, e.g., textured side to textured side. The force required to slide one piece across the other was measured. The static COF is the ratio of the force needed to initiate the sliding movement to the force acting perpendicular to the two surfaces in contact The dynamic COF is the ratio of the force needed to keep the film moving to the force acting perpendicular to the surfaces. Measurements were made in accordance with ASTM D 1894.

EXAMPLE I

A wholly aromatic thermotropic liquid crystal polymer comprising 27 mol % of units from 6-hydroxy-2-naphthoic acid and 73 mol % of units from p-hydroxybenzoic acid was heat kneaded through a single-screw extruder at a temperature of 280° to 300° C. and extruded through a tubular film die having a diameter of 40 mm and a lip clearance of 0.6 mm, to obtain a film having a thickness of 60 μm. The film obtained had a melting point as determined by DSC of 280° C.

EXAMPLE II

The film obtained in Example I was fed to a nip between a pair of chrome-plated steel press rolls, one of which had a smooth surface while the other had on the surface thereof a "diamond"-pattern of projections (A), i.e., a pair of parallel diagonal projected lines having an average pitch of 3 μm and crossing each other, an average width of 2 μm and an average height of 5 μm, at a roll linear speed of 1.0 m/min and under a linear pressure of 30 kg/cm and pressed. The two steel rolls were each heated by a housed-in heating medium circulating so that their surface temperatures were maintained both at 220° C. The film with its surface thus roughened was evaluated for surface roughness, abrasion resistance and so on. The results are shown in Table 1.

EXAMPLES III THROUGH V

Example II was repeated except that the surface pattern of the press roll was changed. In Example III, the press had a similar diamond pattern (B) to that of Example II, wherein the projected lines had an average pitch of 10 μm, an average width of 5 μm and an average height of 8 μm. The press roll used in Example IV also had a similar diamond pattern (C) wherein the projected lines had an average pitch of 20 μm, an average width of 8 μm and an average height of 10 μm. The press roll used in Example V had a surface having a "dot" pattern (D), with a multiplicity of discrete, nearly conical projections having an average pitch of 10 μm, an average diameter of 8 μm and an average height of 5 μm. The films with their surfaces thus roughened were evaluated in the same manner. The results are shown in Table 1.

COMPARATIVE EXAMPLE 1

The film obtained in Example I was evaluated for abrasion resistance. The results are shown in Table 1.

COMPARATIVE EXAMPLE 2

Example II was repeated except that the temperature of the press rolls was changed to 200° C. The film thus embossed was evaluated in the same manner. The results are shown in Table 1.

It is clear from Table 1 that the films obtained in Examples II through V have markedly better abrasion resistance than the film with no recessions formed on the surface thereof (Comparative Example 1) and the film with recessions having too small a width (Comparative Example 2).

The films obtained in the above Examples II through V showed no change in the tensile strength, their surfaces having a little delustered appearance though.

COMPARATIVE EXAMPLE 3

An attempt was made to repeat Example II except for changing the temperature of the press rolls to 270° C. The film frequently adhered to the roll with roughened surface, thereby giving no film with roughened surface and having sufficient length.

COMPARATIVE EXAMPLES 4 THROUGH 6

Example II was repeated except that the surface pattern of the press roll was changed. In Comparative Example 4, the press had a similar diamond pattern (E) to that of Example II, wherein the projected lines had an average pitch of 100 μm, an average width of 50 μm and an average height of 15 μm. The press roll used in Comparative Example 5 had a similar diamond pattern (F) wherein the projected lines had an average pitch of 200 μm, an average width of 100 μm and an average height of 25 μm. The press roll used in Comparative Example 6 also had a similar diamond pattern (G) wherein the projected lines had an average pitch of 50 μm, an average width of 25 μm and an average height of 8 μm. The films with their surfaces thus roughened were evaluated in the same manner. The results are shown in Table 1.

It is clear from Table 1 that the films with too large W/D, obtained in the Comparative Examples 4 through 6, have poor surface abrasion resistance.

TABLE 1

| | Ex. II | Ex. III | Ex. IV | Ex. V | Comp. ex. 1 | Comp. ex. 2 | Comp ex. 4 | Comp. ex. 5 | Comp. ex. 6 |
|---|---|---|---|---|---|---|---|---|---|
| Treating Conditions | | | | | | | | | |
| Temperature (°C.) | 220 | 220 | 250 | 220 | — | 200 | 250 | 250 | 250 |
| Pressure (kg/cm) | 30 | 30 | 30 | 30 | — | 30 | 30 | 30 | 30 |
| Embossing pattern of roll | A | B | C | D | — | A | E | F | G |
| Properties of embossed film | | | | | | | | | |
| Average diameter of recessions (μm) | — | — | — | 5 | — | — | — | — | — |
| Average depth of recessions (μm) | 3 | 4 | 8 | 3 | — | 1 | 8 | 15 | 4 |
| Average pitch of | 3 | 10 | 20 | 10 | — | 1 | 100 | 200 | 50 |

TABLE 1-continued

|  | Ex. II | Ex. III | Ex. IV | Ex. V | Comp. ex. 1 | Comp. ex. 2 | Comp ex. 4 | Comp. ex. 5 | Comp. ex. 6 |
|---|---|---|---|---|---|---|---|---|---|
| recessions ($\mu$m) |  |  |  |  |  |  |  |  |  |
| Average width of recession ($\mu$m) | 2 | 5 | 8 | — | — | 0.5 | 50 | 100 | 25 |
| Area occupied by recession (%) | 60 | 40 | 40 | 40 | — | 3 | 20 | 20 | 20 |
| Abrasion resistance | 200 or more | 200 or more | 200 or more | 200 or more | 1–5 | 5–10 | 5–10 | 1–5 | 1–5 |
| Tensile strength (kg/mm$^2$) | 35 | 33 | 30 | 35 | 36 | 30 | 30 | 20 | 30 |
| W/D | 2/3 | 5/4 | 8/8 | 5/3 | — | — | 6.25 | 6.7 | 6.25 |

Ratio OF AVERAGE WIDTH OR DIAMETER TO AVERAGE DEPTH OF RECESSIONS.

EXAMPLE VI

Liquid crystal polymer film of Hoechst Celanese's VECTRA® A resin was extruded out of a standard flat film die into the nip formed by a highly polished chrome roll and a matte finished rubber roll. Both rolls were heated internally by hot oil at 200° C. The roll linear speed was 1.5 m/min; a linear pressure of 35 Kg/cm was applied. The molten extruded film was at 280° C. when it contacted the nip between the rolls, where it cooled to the roll surface temperature. The 250 $\mu$m film produced had one side matte and one side gloss. The matte side had an average Ra of 0.94 microns and a dull appearance. The depth of the matte recessions (Rmax) was 10 microns. The width of the recessions averaged 1.5 microns. The matte texture was fine enough so as to constitute approximately 100% surface coverage. The abrasion resistance of the matte side was >200 cycles. The static and dynamic coefficients of friction (COF) for the matte side were 0.28 and 0.28 respectively.

The gloss side of the film has an average Ra of 0.038 microns resulting in a visible high gloss. Abrasion resistance of the gloss side was 5–10 cycles. The static and dymanic coefficients of friction for the gloss side were 0.28 and about 038 respectively. (Unlike the smooth-sliding matte surface, the gloss surface exhibited a slip-stick phenomenom during COF measurement, and the dynamic coefficient of friction showed much more variability during the 2.5 inch test movement.

The matte surface increases abrasion resistance and produces a reduced and less variable dynamic COF, thereby improving handability. The matte texture also allows easier air removal between layers in vacuum lamination operations. (Gloss layers adjacent to one another in laminations can often trap air resulting in nonsealing areas in the laminate.)

EXAMPLE VII

VECTRA® A polyester film was extruded at 280° C. from a die onto a fabric covered belt at 25° C. A smooth unheated steel roller was utilized to press the hot plastic polymer onto the belt, reproducing the fabric belt surface pattern on one side of the 380 $\mu$m thick film and cooling the film below its melting point. The fabric pattern on the film had recessions of approximately 50 microns in depth and an average of 250 microns in width. The recessions covered about 85% of the film surface. The textured side of the film had an abrasion resistance of more than 50 cycles vs. 1–5 cycles for the gloss or untextured side of the film.

Other embodiments and variations of the present invention not specifically described or illustrated above may be apparent to those skilled in the art. This invention is not limited to the specific embodiments set forth herein, but encompasses the entire subject matter of the appended claims.

We claim:

1. An unfilled film comprising a polymer capable of forming an optically anisotropic melt phase, said film having an embossed surface provided with a plurality of recessions, said recessions occupying from about 25% to about 80% of said surface wherein said recessions have an average depth of from about 1 to about 10 $\mu$m and an average width or diameter of from about 1 to about 10 $\mu$m and further wherein the average width to depth ratio of said recessions is about 5.5 or less, said film being up to about 200 $\mu$m thick.

2. A film according to claim 1 wherein the ratio of the average width or diameter to the average depth is about 2 or less.

3. A film according to claim 1 wherein said polymer comprises units derived from p-hydroxybenzoic acid and 6-hydroxy-2-naphthoic acid.

4. A film according to claim 3 wherein said polymer has a transition temperature to an anisotropic melt phase in the approximate range of 250°–350° C.

5. A film according to claim 1 wherein said polymer has a transition temperature to an anisotropic melt phase to the approximate range of 250°–350° C.

* * * * *